Dec. 30, 1924.

H. WITTEMEIER

FILTER FOR PURIFYING AIR

Filed Jan. 5, 1921 — 5 Sheets-Sheet 1

Inventor:
Hans Wittemeier
By C. P. Goepel
Attorney

Dec. 30, 1924.  1,521,575
H. WITTEMEIER
FILTER FOR PURIFYING AIR
Filed Jan. 5, 1921   5 Sheets-Sheet 3

INVENTOR
*Hans Wittemeier*
BY C. P. Goepel
his ATTORNEY

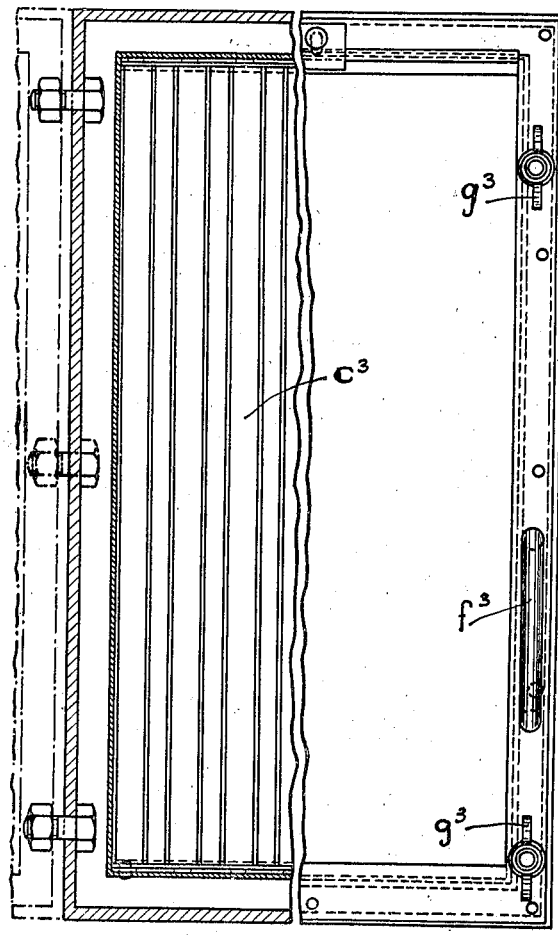
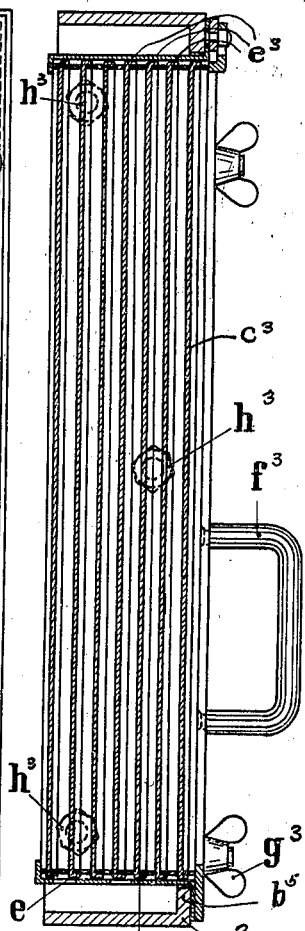
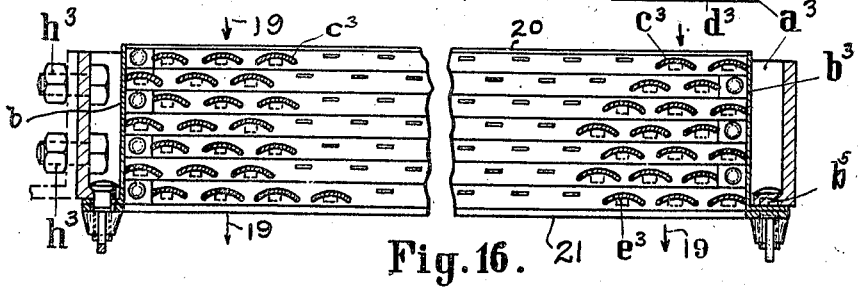

Patented Dec. 30, 1924.

1,521,575

UNITED STATES PATENT OFFICE.

HANS WITTEMEIER, OF BERLIN, GERMANY.

FILTER FOR PURIFYING AIR.

Application filed January 5, 1921. Serial No. 435,288.

*To all whom it may concern:*

Be it known that I, HANS WITTEMEIER, a citizen of Germany, and a resident of Berlin, Germany, have invented certain new and useful Improvements in Filters for Purifying Air, of which the following is a specification.

In many technical processes and plants the purification of the air plays an important part. In heating and ventilating plants the cleaning of the air is necessary for hygienic reasons; in turbo-generators, compressors and the like the air must be deprived of dust in order to secure their reliability of operation which would be impaired by dirt that would rapidly collect in sensitive parts of the machines.

The materials that were used hitherto for filtering purposes were substances whose structure or texture were such as to present the largest possible surface, combined with a small resistance, to the air passing through them. Such substances are, for example, porous and granulated bodies, fibrous and textile materials, and, in a smaller measure, finely distributed liquids.

Hitherto the preference has generally been given to fibrous stuffs in the form of filtering cloths. But these still have two serious drawbacks. In the first place, the clogging up of the cloth by the dust results in a rapid increase of the resistance offered to the air passing through it; and secondly, even if they are impregnated with a non-combustible agent they are not sufficiently proof against fires, which are liable to occur, especially in electric generators. This drawback had to be met by providing special fire-preventing flaps.

These drawbacks are obviated by making the filtering members of layers of non-combustible bodies of any geometrical shape such as balls, cylindrical or prismatic rods of glass, porcelain, etc., which, in order to increase their adhesiveness, are coated by a non-evaporating liquid such as glycerine or the like.

The advantages offered by the new invention are as follows: The proneness of the filter to become rapidly clogged with impurities is removed, because the dirt-removing operation principally consists in repeatedly deflecting the innumerable air jets into which the whole air current is divided. The arrangement of the filter may be such that the untreated air first encounters a layer of comparatively large balls and then passes through additional layers of finer balls.

Another advantage is that the casing of the filter may be made of any space-saving shape such as rectangular, round, etc., whilst it is known that cloth filters are limited to rectangular shapes for technological reasons.

Finally, special mention must be made of the extraordinarily convenient manner in which the various elements of the filter may be cleaned whilst the plant is in operation. The filter balls are simply taken out at the foot of each element of the filter, and then washed and replaced through the top. Thus a simple mechanical cleaning process is employed and the soiled filter material is always re-used after cleaning, whilst the so-called filter cloths had to be cleaned from time to time by a chemical process and were worn out very much faster.

The invention is illustrated in the drawings in which—

Fig. 15 is a front view, partly in section;

Fig. 16 a horizontal section, and

Fig. 17 a vertical section of Fig. 15 in which a special form of dust-retaining body is used in the filter.

Similar letters of reference indicate corresponding parts throughout the various views.

Figure 1:
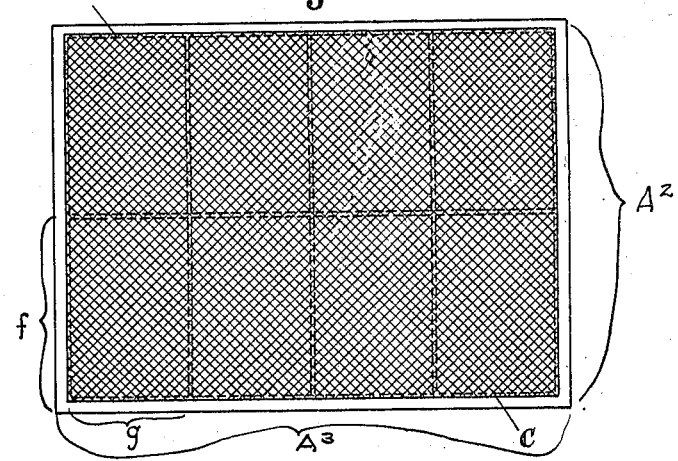
Fig. 1 is a front view of an element of a filter.
Figure 2:
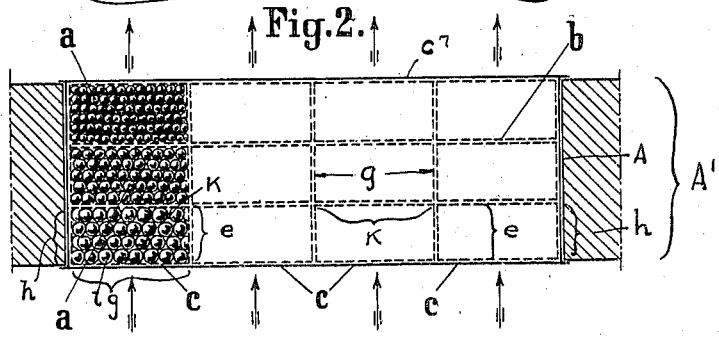
Fig. 2 is a horizontal section of the same.

The filter shown in Figs. 1 and 2 consists of a case adapted to be built into a wall and having two outside walls c and intermediate walls b, the various compartments being filled with dust-retaining bodies a of any desired shape and thrown in in any manner. The bodies a are made of any suitable non-combustible material and moistened with glycerine or any other viscous liquid.

The balls a moistened with glycerine are stacked up in the space between the wire grids b and cause the current of uncleaned air to be divided up into a large number of jets and to pass along tortuous paths. In passing along these paths the impurities, such as dust and drops of water brush against and are retained by the surfaces of the balls. To enhance the seizing effect of the impurity-retaining balls, these latter may be provided with roughened or ribbed surfaces.

The air passes from the room c containing the uncleaned air through the front wall of the box or case and deposits its impurities on the retaining bodies b, and then passes out of the rear wall of the case into the cleaned air chamber.

In Fig. 1, eight cells are visible and in Fig. 2, twelve cells are visible.

At the rear of the moistened retaining bodies another filtering layer may be arranged which is dry so as to act as a moisture-collecting agent that retains any particles of liquid that may have been carried along. This dry layer may be made similar to the dust catching layer, or any other material or bodies suitable for accomplishing the desired effect may be employed. Suitable substances are, for example, asbestos, glass wool, or the like.

In the preferred arrangement, the layer of dry filtering bodies is not placed immediately behind the moist layer, but an empty space is left between them. The air which streams through the first layer at a comparatively high speed and deposits its dust in the first layer, but which is liable to carry fine particles of the moistening fluid along with it, become steadier in the empty space and sheds most of its moisture in this space. Any remaining moisture is completely removed whilst the air is passing through the layer of dry filtering bodies.

If desired, the filter may even be provided with a dry layer formed of granules that are adapted to bind water, so that the air flowing through the dry layer is not only deprived of any particles of water but also of the water contained in the air in a gaseous state and the current of cleaned air will not only be freed of dust but also of all moisture.

The arrangement just described could be obtained by filling the first compartments nearest the incoming air of Fig. 2 with moistened dust-retaining bodies and the rear compartments with dry moisture-retaining bodies, whilst the intermediate compartments are left empty. The air to be purified flows in the direction indicated by the arrows.

An arrangement for preventing the liquid from splashing out of the filter, and which will yet allow the air to pass through the filter wall, may be obtained by making the wall of perforated sheets whose perforations are completely or partly covered at the side next to the filtering layer by small inclined surfaces or roofs that slope downward towards the said layer.

Perforated sheets of this kind can be made, for instance, by partially stamping small tongue-shaped surfaces out of a sheet and bending all the small tongues to one side, so that a wall is formed that is somewhat similar to the scaled surface of a fish. Dripping walls of this kind, i. e., walls from which the liquid drips off at one and the same side can also be made up of flat iron strips arranged like a Venetian blind with each strip inclined downward towards one side.

Figure 3:
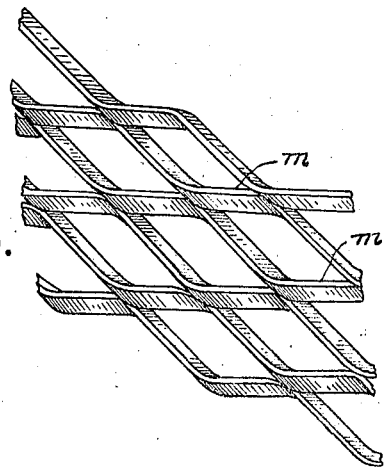
Figs. 3 and 4 show a special constructional form of a wall of the filter cells.
Figure 4:

The desired result is accomplished in a very efficient manner by means of trellis-like sheet metal whose strip-like surfaces are all inclined downward towards the same side. A portion of a sheet of this kind is shown in Figs. 3 and 4. This is produced by making staggered slits in a sheet and then stretching it, when the illustrated trellis-like structure with slanting surface elements will result. A liquid trickling down such a sheet of slitted stretched metal always tends to flow to the side towards which the various strips of the sheet slope in a downward direction, so that the liquid is completely prevented from passing through to the opposite side.

The liquid caused to trickle down and over the dust-retaining bodies and to moisten them may also be an alkaline liquid. The said bodies may themselves consist of alkaline substances such as pieces of soda. An important object that may be accomplished by this means is the binding or absorption of steam, vapors, or acid sprays that are liable to occur in chemical factories or workshops and to be a danger to persons, machines, apparatus or other objects in the particular rooms or shops in question. An advantageous trickling liquid to use is amin or aniline.

Figure 5:
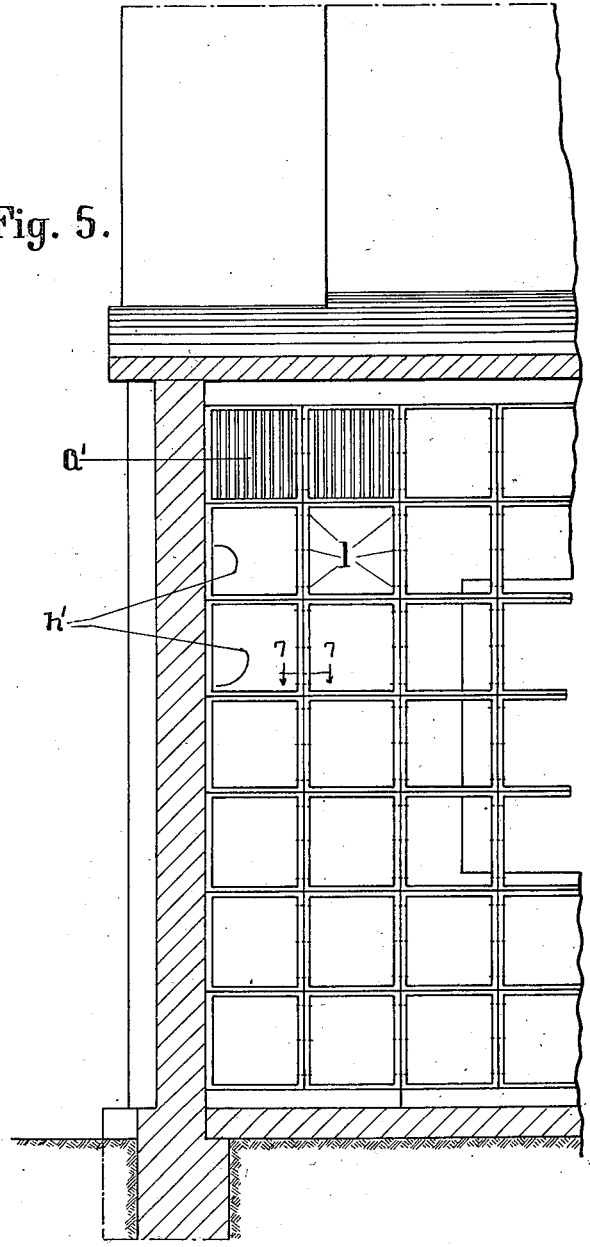
Fig. 5 shows how the filter elements are united into bays.
Figure 6:
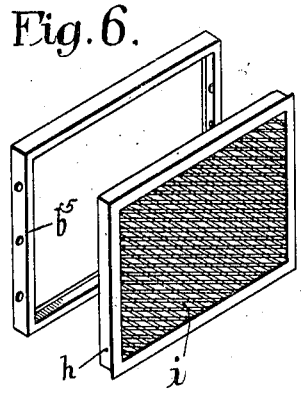
Fig. 6 is a perspective view of one of the cells and its frame shown as removed from the supporting frame of Fig. 5.
Figure 7:
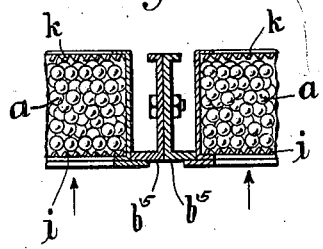
Fig. 7 is a section on line 7—7 of Fig. 5.

Fig. 5 shows how the novel filter elements may be united into filter bays. The individual panels $h'$, which are preferably made of angle-iron whose two sides are of different width, as shown in Figure 7, are simply fastened to each other in any desired number by screws indicated by 1, as shown in Figure 5, so that openings, as for window panes, are formed, into which the filter cells $a'$ furnished with the dust-retaining or moisture-retaining bodies may subsequently be inserted.

This novel arrangement renders it possible to produce filters of any desired size in the shortest possible time from parts that are kept in stock, because the individual panels can be put together in any desired manner according to the particular purpose in view. The novel filters are much lighter, easier to replace, and hence more readily repaired than known kinds.

Figure 13:
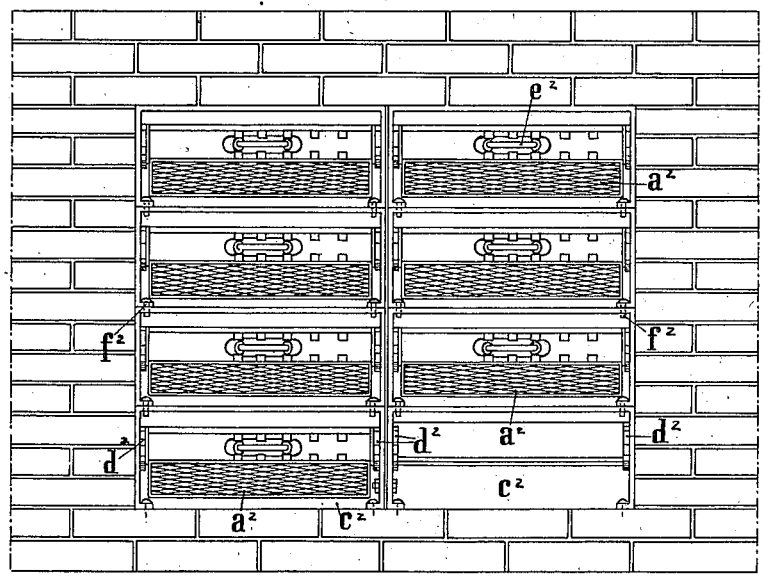
Fig. 13 is a front view showing a plurality of filter cells in docket like pockets.
Figure 14:
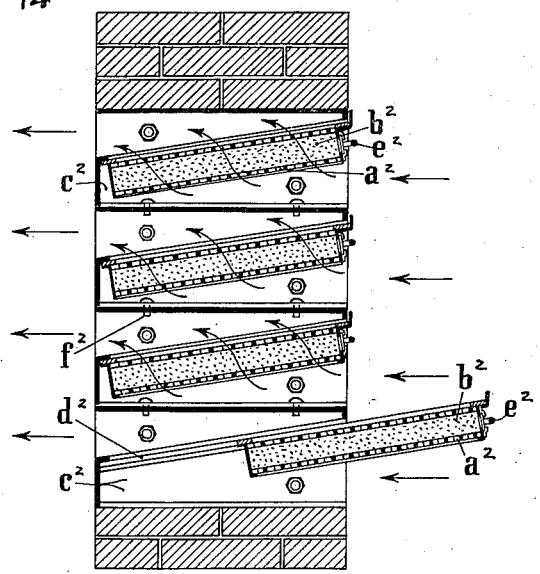
Fig. 14 is a vertical section taken on line 14—14 of Figure 13, showing the filter elements or cells each arranged in a slanting position in a separate aperture in the wall.

A special method of constructing the individual filter panels and the individual filter cells attached thereto, as well as a special manner of arranging these panels and cells in openings in a filter bay that is built into an opening in a wall, is shown in Figs. 13 and 14. The arrangement according to these figures is such that the filter walls, between which the dust or moisture-retaining bodies are enclosed, do not extend vertically, i. e. at right angles to the direction of the hole or passage through the wall in which the filter is placed, but are arranged in a slanting position. The current of air which passes through the wall is thus deflected by the air filter from its normal direction.

This arrangement offers many advantages. In the first place, the effective surface of the filter is very much greater than the cross-sectional area of the air channel or passage, which latter, in ordinary arrangements, is approximately equal to the area of the filter. Secondly, the novel arrangement renders it possible to so arrange the filter cells that each individual cell may be conveniently taken out and replaced, this being important for the cleaning and renewing of the dust-retaining coating of the dust-retaining bodies. The cells filled with the dust-retaining bodies are pushed into slideways $d^2$ in the filter bay in a similar manner to a chest of drawers. The slideways $d^2$ are arranged to be perfectly dust tight so that no dust can pass through any part of the filter passage.

Another advantageous feature is that the filter cells and sliding frame are easily constructed of very simple elements consisting of pieces of sheet of uniform size, each of which is simply bent into the form of a long angle bar. The slideways are also made by thus bending pieces of sheet metal of uniform size.

Fig. 13 is a front view and Fig. 14 is a vertical section of a filter bay of this kind. Inserted between the sloping filter walls $a^2$ are filtering bodies $b^2$. The filter cells are slipped into the docket-like openings $c^2$ of the bay, the lateral sliding bars at the top of the cells being adapted to slide in the lateral slideways $d^2$ attached to the side walls of the openings $c^2$. Handles $e^2$ are provided by which the individual filter cells can easily be pulled out. The bottom cell is shown drawn half way out in Fig. 14. The individual frames of the bay are preferably screwed together by screws $f^2$. The general flow of the air is indicated by the arrows shown in Figure 14.

In Figs. 15, 16 and 17 a special kind of dust-retaining members or bodies is shown which is moistened with the aforesaid viscous liquid. The dust or moisture-retaining bodies consist of vertical rods or bars arranged in staggered rows of a sufficient number for the purpose in view; 7 rows being shown in the drawing, Fig. 16. Each bar is fixed by lugs $e^3$, one at the bottom and one at the top, which fit into holes in the bottom and top transverse bars $d^3$ of the frame and are bent round after they are slipped through the said holes. The air to be cleaned, on entering the filter, which may be composed of any number of cells or panels, impinges upon the bars, which should be moistened, or have liquid continually trickling down them. By the time the air reaches the other side of the filter, it will be quite clean so that it leaves the filter in a pure state and the flow of the air is indicated by the arrows 19. The curved bars $c^3$ provide quiescent spaces leeward of the air flow passing in the direction of the arrows 19. The side walls $b^3$ restrain the air flow therebetween. The frames $a^3$ may be secured to each other by bolts $h^3$. The filter cells may be held to the walls $b^5$ of the frames by bolts $g^3$. A handle $f^3$ facilitates the removal of the cells. The front of the cell is indicated by 20 and the rear by 21.

From the foregoing, it will have been seen that the filter cells such as used in the structures shown in Figs. 2, 6, 7, 14 and 16, for example, are formed of members which are so arranged in respect to the air passing through the same, that they form a group of members with interstices therebetween. These interstices are of a special kind, namely, breathing holes, apertures or vents which may be defined as spiracles having spaces which are barricaded against the air streaming through the depth of the group of members to calm the air. That is, the air is rendered still or quiet and it is free from that which might cause motion. Within such spaces of becalmed air irregular triangular-like spaces or spandrels are formed in which the dust is arrested. The dust contacting with the viscous coatings lining the spiracles gathers in the protected corners thereof, until the cell is cleaned as hereinbefore described. In all of the embodiments shown in the drawings, the filtering material or bodies are relatively small, and provide a large surface. As an example, may be given one cubic foot of filter bodies equal to two hundred square feet of surface.

This invention may be developed within the scope of the following claims without departing from the essential features of the same and it is desired that the specification and drawings be read as being merely illustrative and not in a limiting sense except as necessitated by the prior art. From the foregoing description and drawings, it is clear that the filter shown in Fig. 2 consists of a frame A, incombustible walls c, having openings therein, intermediary walls b, having openings therein, and incombustible filtering means a between the walls. The air passes in the direction of the arrows. The frame A has a relatively small depth $A^1$, that is, the height $A^2$ or width $A^3$ of the frame is considerably greater than the depth $A^1$ of the frame. This is also true of each cell shown in Fig. 2, in which the depth e of the part h of the frame A is less than the height f or width g. This frame h has an open front and an open rear, and across the front and rear the perforated or reticulated walls i and k of incombustible material are provided to complete the cell. Preferably this wall i at the front is like that shown in Figures 3 and 4, obtained by expanding metal whereby sharp corners m are formed. The rear wall k of a cell of Fig. 2, may be of sieve-like material like that shown in Fig. 1. In Fig. 2, the entire front c is exposed freely to the atmosphere, that is, there are no channels, or conduits, or the like necessary, but the entire surface is open directly to the atmosphere, and in free communication therewith. It is the same with the rear wall $c^7$. Thus, the entire front and rear wall is in free communication with the atmosphere.

Figure 11:
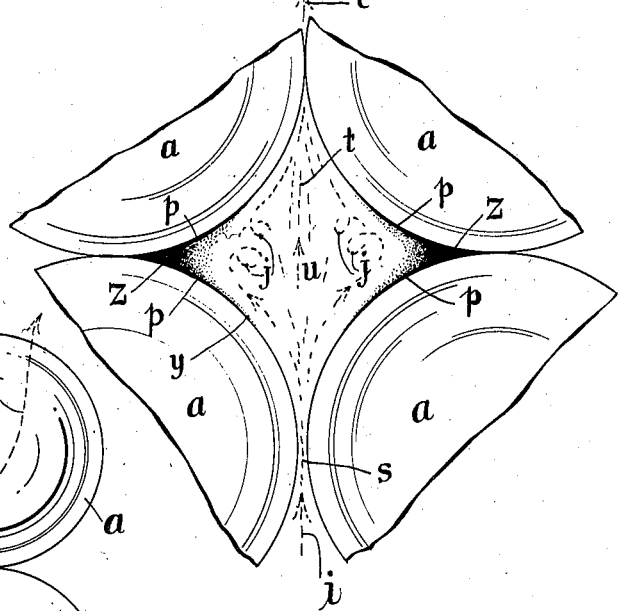
Fig. 11 is a diagrammatic view of the action of air in respect to several of the filter members.
Figure 12:
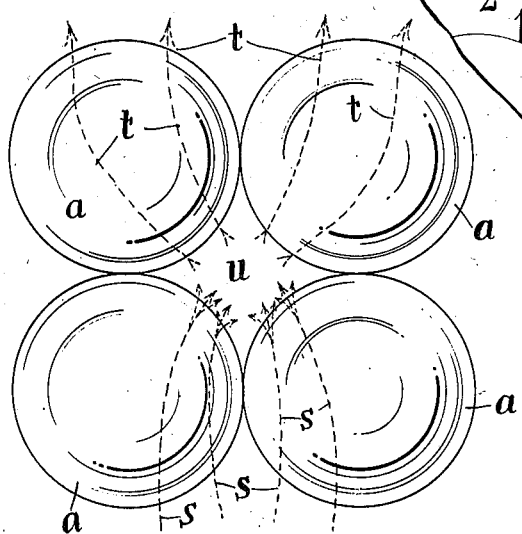
Fig. 12 is also a diagrammatic view of same, but taken at right angles to Fig. 11.

The incombustible filling material, such as the balls or spheres shown in Fig. 2 or other shapes, causes the entire air current to be divided into innumerable air streams which are repeatedly deflected. These streams pass along tortuous paths. It will be noted that between the bodies there are spaces, which attenuate, then widen and then attenuate again to a sharp contour, for instance, as shown in Figures 11 and 12. The air enters such spaces in attenuated form, spreads out, since several streams from different direction meet or unite in the enlarged space and then from this union of air, individual streams again develop and pass through in between the spheres in attenuated form. It may be said that each outgoing individual stream has some part of the air of each incoming individual stream that entered the uniting space. This repeats itself, and thereby successively the air divides and re-unites. Thereby the dust held in the air is separated from the air, and drops on the viscous coating of the filtering members and is temporarily held thereby. Such dust as falls on the coating of the filtering members, which is in the direct and general path of the air flow, is moved along in the coating until it lodges and is arrested at a place where it is not influenced by the general air-flow. Such places are, so to say, leeward to the wind, or in partial or total eclipse to it, in other words, ecliptic portions of the members arrest the dust separated from the air. Some of such places form protected pockets. These pockets are formed by contiguous walls of the members out of the path of the general air flow. The coating accumulates more in the pockets than in the exposed surfaces of the members, and the dust settles in these accumulations of viscous material, namely, in such places where they are not under the influence of the general direction of the air-flow, and are thereby held in position until the filter is cleaned.

The repeated and successive sub-division and re-uniting of the air sets up what may be called a breathing, and this breathing of the cell, may be said to be in synchronism with the vibrations of the atmosphere, so that as the air from the surrounding atmosphere enters the filter cell and is sub-divided and re-united, it deposits its dust in the interstices between the filter bodies, and then leaves the filter cell in free-from-dust condition.

The cleaning action may be said to be automatic, since no forced pressure is essential as in the prior art, nor any guiding means as conduits are required, and pumps are entirely dispensed with. Slight differences of temperature between the front and rear of the filter are sufficient to bring about a passage of air therethrough. If a filter is placed in a wall of a room which encloses a dynamo, with the exterior of the filter exposed to the exterior atmosphere, the comparatively slight agitation or suction of the air produced by a dynamo in its room is sufficient to cause a passage of air through the filter in the wall.

Figure 8:
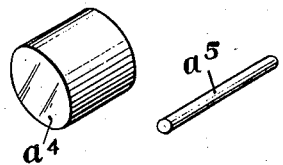
Fig. 8 is a perspective view of other forms of filtering members of cylindrical form.
Figure 9:
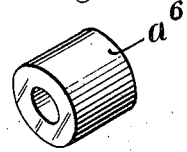
Fig. 9 is a perspective view of still another form, also of cylindrical contour.
Figure 10:
Fig. 10 is a perspective view of still another form of prismatic shape.

Instead of the spherically shaped filtering members as shown in Figure 2, cylindrically shaped members $a^4$, $a^5$, and $a^6$, as shown in Figs. 8 and 9, may be used or also prismatically shaped members $a^7$, as shown in Fig. 10, or any other shape may be used. My invention does not reside in the shape of such bodies per se, but in the aggregate action thereof, and such bodies may be placed regularly or irregularly in respect to each other.

In Figures 11 and 12, there is shown diagrammatically the general activity of the air as it passes by the spherical bodies for instance, but the action is substantially the same with such other bodies as hereinbefore referred to. The air flows through the more or less narrow interstices between the filtering bodies $a$ in more or less attenuated streams $s$ until it reaches a larger space $u$ where there is a union of the various streams $s$. Then this again separates into streams $t$ which streams consist of some air from each of the streams $s$. The union of the various streams in the uniting space in a diffusing manner, cause the dust to separate from the air and deposit on the viscous coating. When deposited on the coating which is in the path of the general air flow as those indicated by $y$ they move along until protected by the pockets $p$, where they permanently deposit in the oil aggregate $z$. In Figure 11, the general air flow is shown by the arrow $i$ and the diffusing characteristic by the dotted lines $j$. It is not intended to have arrow $i$ indicate a forced current which would draw with it the dust, instead of allowing it to deposit.

In Fig. 5, the interchangeable units $a'$, are supported by an auxiliary frame, which is U-shaped in cross-section as shown in Fig. 7, and which is self supporting and in turn supports the filter units when held by the joining means.

The above principle underlying the operation of the filter has been described in order to make clear the principle of operation underlying the invention, but further and more specific theories based on known scientific principles relating to air, eddy currents, diffusion, etc. will be clear to one skilled in this art.

I claim:

1. A self contained air filter, comprising a frame, incombustible walls for the open front and rear of said frame, having air passage openings therein, the entire front and rear walls adapted to be exposed to the atmosphere so as to be in free and open communication therewith, the walls being spaced apart a distance less than either the length or the breadth of the walls, incombustible filtering means between the walls, arranged to repeatingly and successively subdivide the air entering through one wall, into small attenuated streams and reunite the same and again sub-divide the same between the walls, and a viscous coating for the filtering means whereby the dust is collected by the same on the filtering means between the walls, the air leaving the other wall free from dust.

2. A self contained air filter, comprising a frame, incombustible walls for the open front and rear of said frame, having air passage openings therein, the entire front and rear walls adapted to be exposed to the atmosphere so as to be in free and open communication therewith, the walls being spaced apart a distance less than either the length or the breadth of the walls, incombustible filtering means of geometrical shape between the walls, arranged to repeatingly and successively subdivide the air entering through one wall, into small attenuated streams and re-uniting the same and again sub-dividing the same between the walls, and a viscous coating for the filtering means whereby the dust is collected by the same on the filtering means between the walls, the air leaving the other wall free from dust.

3. A self contained air filter, comprising a frame, incombustible walls for the open front and rear of said frame, having air passage openings therein, the entire front and rear walls adapted to be exposed to the atmosphere so as to be in free and open communication therewith, the walls being spaced apart a distance less than either the length or the breadth of the walls, incombustible filtering means between the walls, arranged to repeatingly and successively subdivide the air entering through one wall, into small attenuated streams and reunite the same and again sub-divide the same between the walls, pockets out of the path of the airflow protected by the filtering means, and a viscous coating for the filtering means within the pockets whereby the dust is collected by the same on the filtering means between the walls and within the pockets, the air leaving the other wall free from dust.

4. An air filter, comprising a frame, incombustible walls for the open front and rear of said frame, having air passage openings therein, the entire front and rear walls adapted to be exposed to the atmosphere so as to be in free communication therewith, the walls being spaced apart a distance less than either the length or the breadth of the walls, and the front wall having sharp edges in the path of the incoming air, incombustible filtering means between the walls, arranged to repeatingly and successively subdivide the air entering through one wall, into abruptly formed small attenuated streams and re-unite the same into larger streams between the walls, and a viscous coating for the filtering means whereby the dust is collected by the same on the filtering means between the walls, the air leaving the other wall free from dust.

5. In combination, with a plurality of interchangeable units, each consisting of a frame, incombustible walls spaced apart for said frame and having air passages therein, an incombustible filtering means between the walls having a viscous coating thereon and forming air passages of restricted and expanded configuration, and incombustible auxiliary interchangeable frames each surrounding one of the filter unit frames for holding the same, and means joining the auxiliary frames one to the other, for holding a plurality of filter units in operative position one adjacent the other, the auxiliary frames being self supporting.

6. In combination, a filter comprising a group of interstitial incombustible members having a viscous coating, forming viscous lined air-holes therebetween, the depth of the group being less than the length or breadth thereof, and an enclosing frame along the length and breadth thereof, the barricaded spaces of the air-holes in respect to the air moving through said depth, calming the air, and the sheltered portions of the air-holes arresting the separated dust therein.

7. In combination with a plurality of interchangeable filter units, a main frame, and a plurality of auxiliary interchangeable frames each surrounding at least one of the filter units for holding the same, said auxiliary frames adapted to bear one upon the other in superposed and laterally adjacent relation within the main frame.

8. In combination with a plurality of interchangeable filter units, auxiliary interchangeable frames each surrounding one or more of the filter units for holding the same, and means for holding the auxiliary frames in superposed and laterally operative contact, one with the other, the auxiliary frames being self-supporting.

In testimony whereof he hereby affixes his signature in presence of two witnesses.

HANS WITTEMEIER.

Witnesses:
  E. H. LORD,
  ARTHUR SCHROEDER.